Sept. 2, 1969   L. RABIAN ETAL   3,465,220
DIGITAL DECADE POSITIONING SYSTEM INCLUDING A STEPPING
MOTOR "FINE" DECADE DRIVE FOR THE SCALE-SCANNER
Filed Sept. 2, 1966   4 Sheets-Sheet 1

INVENTORS
LASZLO RABIAN
GEORG GRENDELMEIER

BY Henderoth, Lind & Ponack
ATTORNEYS

United States Patent Office 3,465,220
Patented Sept. 2, 1969

3,465,220
DIGITAL DECADE POSITIONING SYSTEM INCLUDING A STEPPING MOTOR "FINE" DECADE DRIVE FOR THE SCALE-SCANNER
Laszlo Rabian, Zurich, and Georg Grendelmeier, Dietikon, Switzerland, assignors to Oerlikon-Buehrle Holding Ltd., Zurich, Switzerland
Filed Sept. 2, 1966, Ser. No. 576,989
Claims priority, application Switzerland, Sept. 2, 1965, 12,292/65
Int. Cl. G05b *11/00;* H02p *7/18*
U.S. Cl. 318—18                      9 Claims

ABSTRACT OF THE DISCLOSURE

A device for the automatic displacement of a scale by a preselected decadal amount relative to a photo-electric scale-scanner. A slider drive is controlled by a signal proportional to the difference between the actual and nominal values. A sensor is operated from at least the last decade of the nominal value and there is a stepped disc for operating the sensor. A stepping motor drives the disc and a pulse computer feeds the motor with pulses and moves the sensor in the direction of the enlarged projection of the scale divisions. The sensor is connected with the stepped disc via a contact and is movable in the direction of the projected scale on a device consisting of two parallel flat springs. A pin makes contact with a stationary conductor at the moment when the contact passes from sector "9" to sector "0" on the stepped disc. The contact lies on the stepped disc by pretensioned springs.

---

The invention refers to a device for the automatic movement of a scale by a pre-selected decade distance relative to a photo-electric scale-scanner by means of a drive controlled by a signal proportional to the difference between the actual and nominal values.

It is essential with devices of this nature that reliable and rapid operation is achieved. Therefore, it must at least be possible to make them simply and inexpensively from standard, robust electronic components.

A device of the above kind is already known in which the sensor, when used with a machine tool, for example, to determine the displacement of its work-table to an accuracy of 0.01 mm., has to operate at too high a pulse frequency for present day displacement speeds. Thus a standard is made of 10 kc./s. for the frequency of the 0.01 mm. scale graduations moving past a sensor with a displacement speed of 6 meters per minute. It is known from experience that such a device is highly subject to interfere from stray electric and magnetic fields such as can occur in heavy current machine installations.

Apart from this, an additional undesirable increase of frequency is produced in the known device due to a rapidly oscillating light beam scanning a very finely graduated scale whose manufacture is more difficult and costly than a scale subdivided into 0.1 mm. divisions.

An object of the present invention is to avoid these disadvantages by operating the sensor from at least the last decade of the required value by means of a stepped disc driven by a stepping motor controlled by pulses from a pulse computer and moving it in the direction of the enlarged projection of the scale divisions.

This solution has the advantage that the pulse frequencies used can be reduced by at least one tenth. It is then possible to use surface photo-electric elements with constant properties whose frequency range extends up to 10 kc./s. and which could not be utilized for the known device. In addition, the resultant frequency reduction permits the use of normal semi-conductor counters, which have an upper frequency limit of about 50 kc./s. A further advantage to be noted is that for moving the sensor, simple mechanically reliable components can be used, which is an advantage when combined with an optical visual scale reader.

With the above and other objects in view which will become apparent from the detailed description below, some preferred embodiments of the invention are shown in the drawings, in which.

Figure 1:
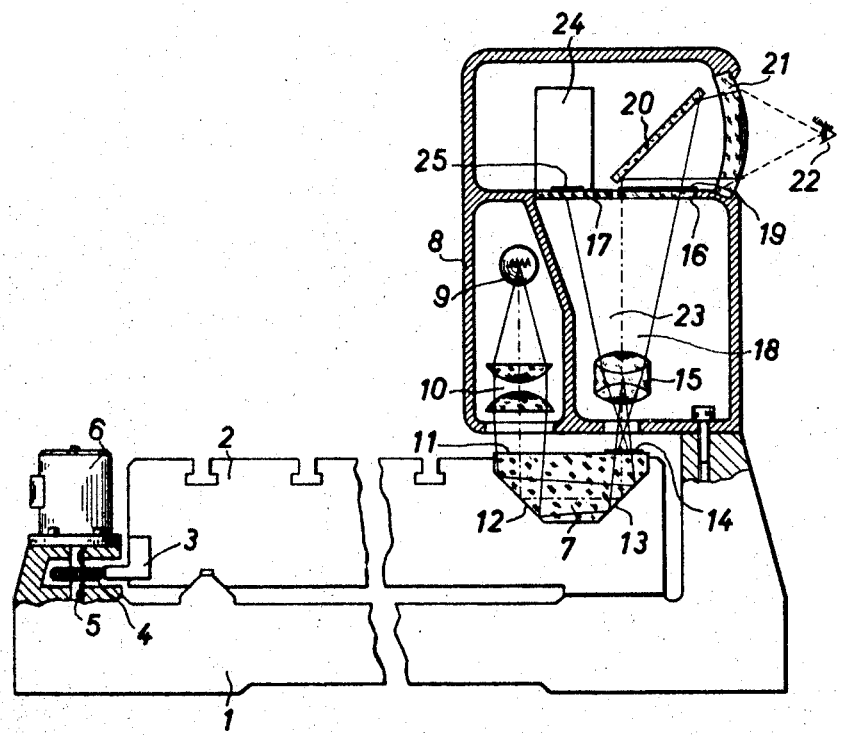
FIGURE 1 is a diagrammatic view partly in section and partly in plan showing a machine tool with associated optical photo-electric measuring microscope and a scale in a table movable in one axial direction.

FIGURE 1 shows a machine tool having a horizontally movable table 2 on a base-plate 1. The table 2 is driven via rack 3 by a pinion 4 fixed to the shaft 5 of an electronically controlled traverse motor 6, rigidly bolted to the base-plate. A prism-section glass scale 7 is secured to table 2. Opposite the glass scale 7 is an optical photo-electric measuring microscope 8 ridigly attached to the base-plate 1. A beam of light from a light source 9 contained in the microscope is converged by condenser lens 10 and after passing vertically through the horizontal surface 11 of the prism 7 is reflected through 90° at each of the surfaces 12 and 13. The beam from the glass scale 7 passes through the divisions of a scale with 1 mm. and 0.1 mm. graduations mounted on the hypotenuse surface 11. The 1 mm. graduations are formed by fine marker lines. The divisions 14 are enlarged twenty times by an objective lens 15 and projected onto two focussing screens 16 and 17 at the same level. One section 18 of the beam passes to an optical visual reader for the 1 mm. divisions of the divisions 14. This device has an evaluation grid 19 of known type on the screen 16, from which the scale displacement can be read, again magnified twice, by an observer 22 via a mirror 20 and an eyepiece 21.

The second part 23 of the beam is directed to a photo-electric reader head 24, where the 0.1 mm. divisions appear clearly as an image 25, also magnified 20 times, on the second screen 17. Since the 0.1 mm. divisions appear on the glass scale 7 as lines 0.1 mm. wide with equal spaces in between, one millimetre of this mesh on the glass scale is projected as five 2 mm. wide dark lines 54 and five 2 mm. wide light lines 55 on the focussing screen 17 (FIG. 2).

Figure 2:
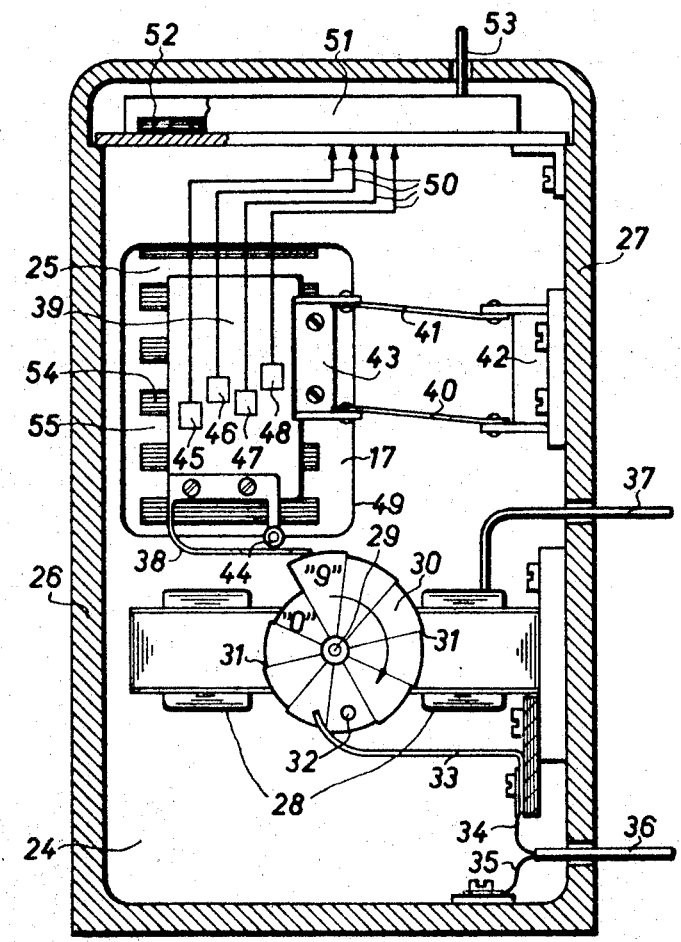
FIGURE 2 is a sectional diagrammatic view of a reading head as used in the measuring microscope of FIGURE 1 with an open case.

The details of the reading head 24 of the measuring microscope 8 are not shown in FIG. 1 but are shown in FIG. 2. The following components are contained in the case 26: a stepping motor 28 of known type, fixed to one wall 27 with rotation in the direction of the arrow, on whose rotor shaft 29 is mounted a stepped disc 30 having ten overlapping sections 31 on its circumference, each displaced a radial distance of 0.2 mm. from the next. A contact pin 32 is placed on the side of the stepped disc 30 which makes contact with a spring contact 33 once per revolution of the disc 30 or stepping motor. The contact 32 is placed on the disc 30 so that it makes contact with the spring contact 33 at the same instant as a sliding contact 38 passes from sector "9" to sector "0" on the disc 30. An electrical conductor 34 is connected to the spring contact 33 and a second conductor 35 is connected to the case 26. Both leads leave the case 26 via a cable 36. Stepping pulses are fed to the stepping motor 28 via a cable 37.

The spring contact 38 slides on the stepped disc 30 and is fixed to a photo-electric element holder 39. The latter is supported by two flat, parallel springs 40 and 41. These are riveted at one end to a support 42 fixed to the base 27. They are similarly riveted at their other ends to a second support 43 rigidly attached to the photo-element holder 39. The two flat springs 40, 41 allow a translatory motion of the photo-element holder which takes place free from friction or backlash. A certain amount of pre-tensioning of the flat springs 40 and 41 ensures that the contact 38 does not lift off the stepped disc 30. The spring contact 38 is placed beneath a damping element 44 supporting the photo-element holder 39, so that the large step from sector "9" to sector "0" on the stepped disc 30 occurs without oscillation.

Mounted inside the photo-element holder 39 are two pairs of photo-electric elements 45, 46 and 47, 48 set opposite to the opening in the section of the case 49 where the focussing screen 17 is situated, and placed at the position of the projected, enlarged dark 54 and light 55 scale divisions 14. The photo-element holder 39 can move in the longitudinal direction of the projected scale by means of the parallel flat springs 40 and 41. Connecting leads 50 from the photo-elements 45 to 58 go to an amplifier 51 contained in the same case 26 and designed as a printed ciricut on a plate 52, likewise rigidly attached to the wall 27. A cable 53 connects the amplifier 51 with an electronic controller (see FIG. 3).

The divisions 54 and 55 of the scale 14, shown enlarged, appear on the ground glass plate 17 with a width of 2 mm. as described above. The photo-elements 45 and 46 separately receive the dark as well as the light divisions 54 and 55 by means of a known process of symmetrical alignment. Therefore the center lines of photo-elements 45 and 46 are displaced by 2 mm. from each other in the direction of the scale, similarly those of photo-elements 47 and 48, but in this case by ¼ screen division, i.e. displaced by 1 mm.

Figure 3:
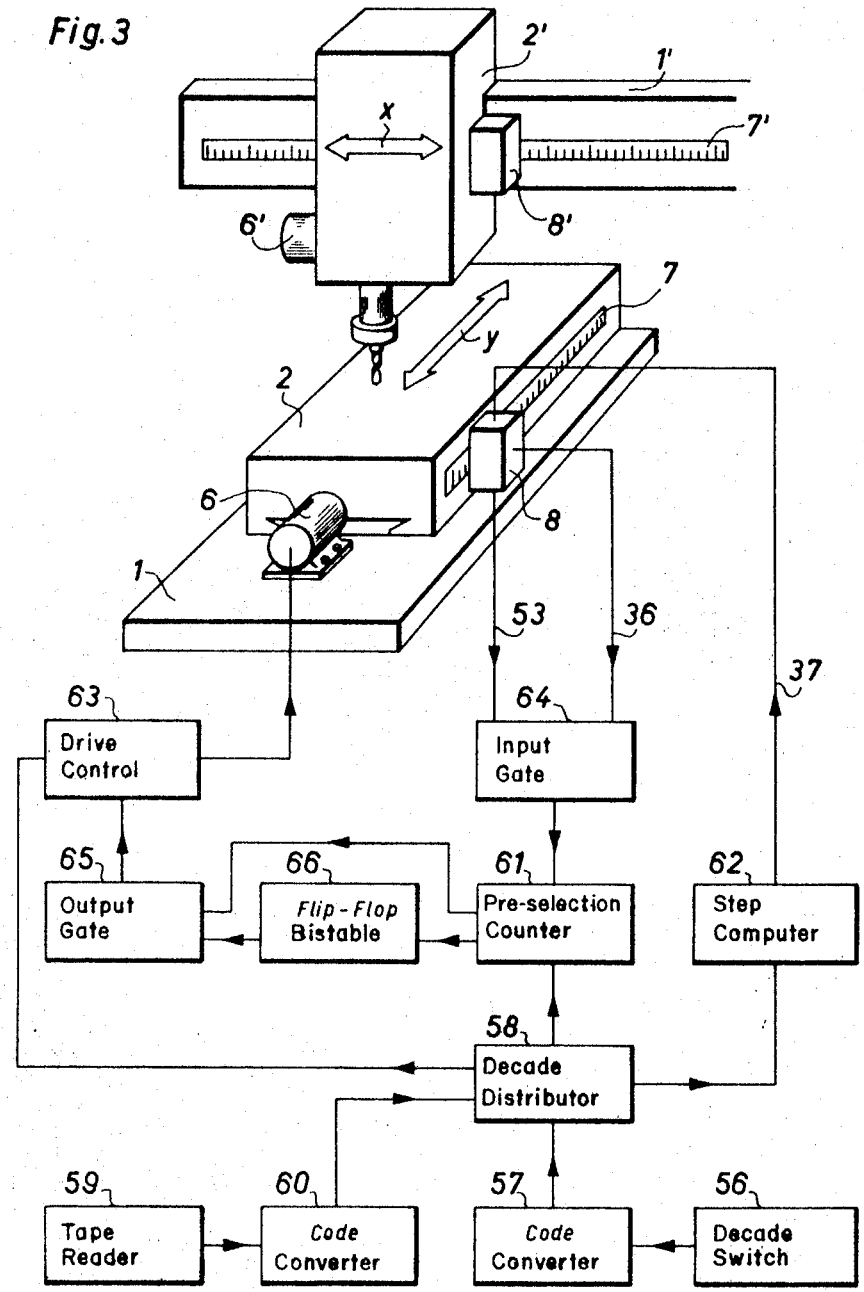
FIGURE 3 is a partial perspective view of a machine tool movable in two axial directions and associated therewith in a schematic block diagram of the automatic unit.

In FIG. 3 is shown in diagrammatic form, a numerical control for a machine tool, in this case a two-dimension jig borer. This example combines the two possibilities of application of the invention as a controller in the case of, for example, a table 2 and scale 7 moving in the Y-direction, with a stationary measuring microscope 8 mounted on base-plate 1, or the reverse case where a stationary scale 7' is fixed to the machine frame 1' and a headstock 2' moves in the X-direction with a measuring microscope 8' and drive motor 6'. With respect to the control diagram both these cases are identical, so that the example chosen in FIG. 1 can again be applied in FIG. 3 to a device for the Y-axis. At the same time manual as well as automatic operations are represented.

A decade switch 56 provides the manual pre-selection of the movement. The decade code of this switch is converted to a binary-decimal code in a code converter 57 and passed to the decade distributor 58. For automatic operation, on the other hand, a tape-reader 59 makes the movement pre-selection via an associated code converter 60 which changes the tape code into the same binary-decimal code. The code converter 60 similarly feeds the same decade distributor 58. This distributor 58 passes all decades except the last to a pre-selection counter 61, i.e. for the number 172.38 the decade containing the digit "8" is omitted. This last decade is diverted in distributor 58 and fed to the step computer 62. The distributor 58 feeds the movement polarities "plus" or "minus" at the same time, in one case to the drive control 63 of the traverse motor 6 and, secondly, to step computer 62. The latter calculates, from the last decade digit and the appropriate sign, the number of steps the stepping motor 28 should make in the reading head 24 of the microscope 8.

The movement of the scale 7 and table 2 is converted into a two-phase electrical signal by the photo-elements 45 to 48 (FIG. 2) in the reading head 24 and fed to an input gate 64. From the two-phase signal counting pulses are formed in input gate 64 dependent on direction and are fed to the pre-selection counter 61 (FIG. 3). The counting pulses shift the contents of the pre-selection counter 61 to zero one by one. Since the output gate 65 monitors the contents of this pre-selection counter 61, it causes the drive control 63 to reduce the number of rotations of the traverse motor 6, dependent on the contents of the pre-selection counter 61. When the contents have fallen to zero, the next pulse arriving to trip the flip-flop 66, after passing via output gate 65 and drive control 63, causes the traverse motor 6 to stop.

Figure 4:
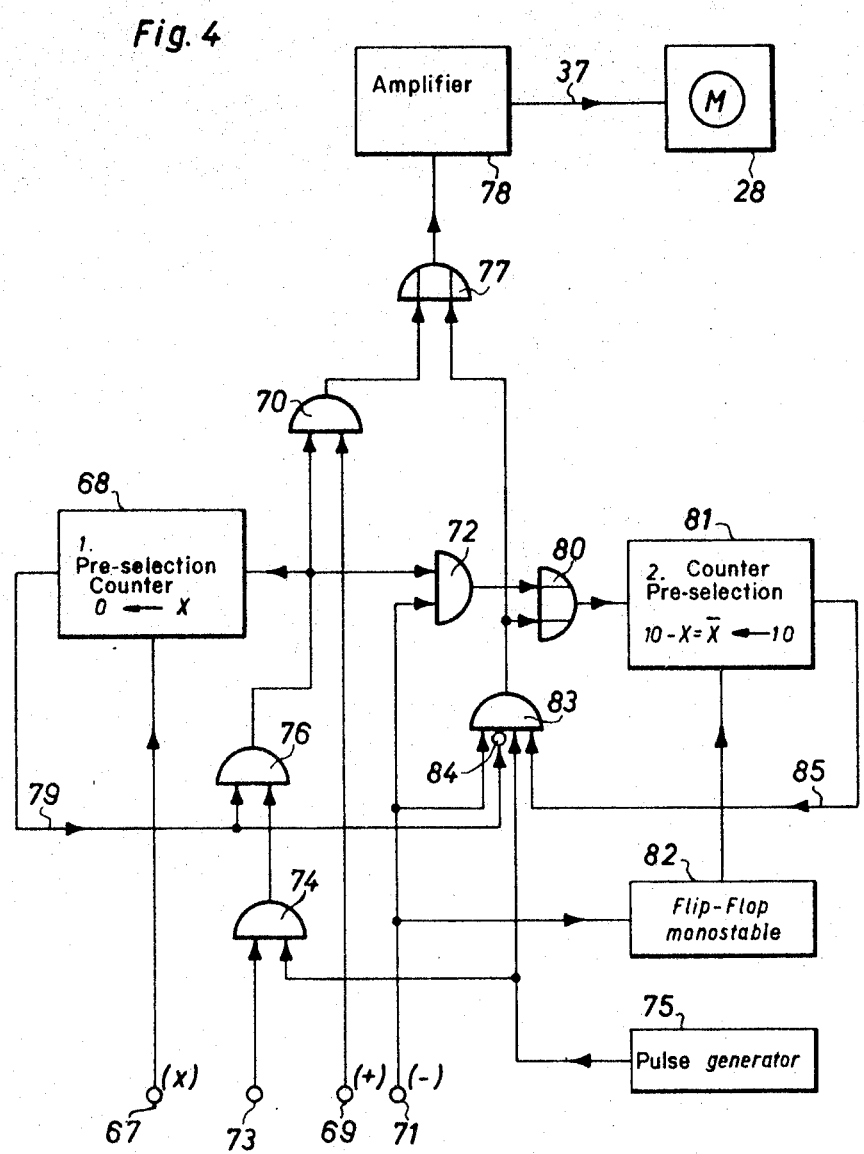
FIGURE 4 is a schematic block diagram of a step computer as indicated in FIGURE 3.

FIG. 4 shows the step computer 62 in detail. A last decade digit X from the decade distributor 58, e.g. the digit "8" as above, is fed to a first pre-selection counter 68 of the step computer 62 via pre-select input 67. Digit X is temporarily stored here.

If the sign from the decade distributor 58 is positive, it is fed to a first "AND" gate 70 via a first input 69. The negative sign enters at a second input 71 and passes to a second "AND" gate 72. Computing starts with a signal from the distributor 58 via a third input 73. This signal reaches a third "AND" gate 74.

The computing process for the determination of the number of steps to be made is performed in the following way for a positive sign:

Following reception of digit X and pre-selection of sign, a third "AND" gate 74 is opened by the signal from the distributor 58 at input 73. Pulses from the pulse generator 75 can then reach a fourth "AND" gate 76. The latter is open because the first pre-selection counter 68 temporarily contains stored a digit X differing from zero. Pulses from generator 75 therefore now reach this first pre-selection counter 68 and shift its contents to zero one by one. At the same time, these pulses pass through the first "AND" gate 70, which is open since a positive sign was pre-selected, and arrive at pulse amplifier 78 via a first "OR" gate 77 and then leave on the previously mentioned cable 37 to the stepping motor 28. When the contents of the first pre-selection counter 68 have fallen to zero, it blocks the fourth "AND" gate 76 via its output lead 79. Then the stepping motor 28 has made a number of steps corresponding with digit X of the last decade.

Since the stepping motor 28 only has one direction of rotation, the number of steps made in the case of a negative sign becomes $\overline{X}=10-X$ instead of the last decade digit $\overline{X}$.

The completion of this process occurs in two stages. In the first stage a digit $\overline{X}$ is produced from a digit X and in the second stage the stepping motor has to make a number of steps corresponding to digit $\overline{X}$, so that in the above example with the digit "8" it would only be 2 steps. This occurs in detail as follows:

After pre-selection of the "minus" path sign at the second input 71 and digit X at the pre-select input 67, the complementary digit $\overline{X}$ is calculated. When the decade distributor 58 opens the third "AND" gate 74 with a signal at input 73, pulses from generator 75 reach the pre-selection counter 68 via the fourth "AND" gate 76, which is opened by the first pre-selection counter 68, and shift its contents to zero. Since, however, a negative sign is assumed to have been preselected, the first "AND" gate 70 is closed and the second "AND" gate 72 is open. The pulses, therefore, reach a second pre-selection counter 81 via the second "AND" gate 72 and a second "OR" gate 80. This second pre-selection counter 81 was supplied with the digit "10" by the negative sign at the second input 71 via the mono-stable multivibrator 82. The contents of this second pre-selection counter are decreased in parallel with those of the first counter 68 for every pulse, in such a way that when the first counter 68 has reached zero, the second counter 81 then has a content of 10−X=X̄. Thus when the contents of the first counter 68 reach zero, the fourth "AND" gate 76 is closed and a fifth "AND" gate 83 opened via a "NOT" gate 84. The fifth "AND" gate 83 is therefore open since a negative sign is selected at the second input 71 and the second pre-selection counter 81 has a content differing from zero. Pulses from generator 75 can thus pass through the open fifth "AND" gate 83. They pass to the second counter 81 via the second "OR" gate 80 and shift its contents to zero. These pulses pass to the pulse amplifier 78 at the same time parallel with the second pre-selection counter 81 via the first "OR" gate 77 and are then fed amplified to the stepping motor 28 by cable 37. When the contents of the second counter 81 are zero, it is blocked by the fifth "AND" gate 83 via conductor 85 so that the stepping motor 28 has completed a number of steps corresponding to the digit X̄.

The method of operation of the complete unit is explained once more by means of the following concrete example (FIG. 3):

Data consisting of a path sign and, for example, a five decade number, such as +172.38 mm. means that table 2 must be moved this distance in the positive direction from its previous position. This data can be fed to the unit manually by the decade switch 56 or on tape. When tape is used, the information is coded and is read by the tape reader 59 and fed to the unit. In either case the code converter 57 or 60 changes the data into a binary-decimal code for which the unit is designed. The decade distributor 58 distributes the information so that the positive sign is fed to the table drive control 63 and the step computer 62 and the sign is stored in both places. The decade distributor 58 feeds the digits in decade sequence, i.e. 1, 7, 2, 3, to the pre-selection counter 61 where they, likewise, are stored. The final digit, the "8," is fed to the step computer 62 and also stored. Subsequently, the distributor 58 informs the step computer 62 that distribution is complete and as described for FIG. 4 the stepping motor 28 makes 8 steps. The photo-elements 45 and 46 leave their previous symmetrical balance position above one of the projected divisions as a result of the action of the stepped disc 30 and the sprung contact 38. Dependent on the previous position of the disc 30, the spring contact 33 will or will not make contact with pin 32 during the eight steps. If contact is made, a pulse is transmitted from the spring contact 33 via the input gate 64 to the pre-selection counter 61 which compensates for the 0.1 mm. displacement of the photo-element holder 39 caused by the drop from sector "9" to sector "0." The traverse motor 6 moves table 2 in the desired positive sense as a result of a signal from the pre-selection counter 61, via output gate 65 and drive control 63. During this motion, the photo-elements 45 and 46 provide counting pulses to the input gate 64 for every symmetrical compensation. Elements 45 and 46 come into symmetrical balance with the dark as well as the light divisions 54 and 55 so that a counting pulse occurs for every 0.1 mm. movement of the table. Owing to the initial displacement of the photo-element holder 39, the first such counting pulse occurs after only 0.08 mm. of table displacement and then further pulses are produced subsequently at every 0.1 mm. movement of the table 2.

The first pulse fed to the pre-selection counter 61 indicates that the table 2 has completed 0.08 mm. movement. It decreases the contents of this counter from 1723 to 1722. Since, however, the table has to be moved to its final selected position, this pulse has to enable the further 1723 pulses to be brought into effect because a movement of 1723 times 0.1 mm. has been preselected. The first pulse has only to report that the 0.01 mm. decade, in the present case with 0.08 mm., has been satisfied. To compensate this pulse, the output of the preselection counter 61 is fed to a bi-stable multivibrator 66. This is to provide one more pulse than was pre-selected in counter 61 to open the output gate 65. By this means the traverse motor 6 can be kept stationary via the drive control 63.

The above pulse which reported that the last decade was satisfied, also occurs if the last digit is zero.

The second pair of photo-elements 47 and 48 protect the formation of counting pulses, occurring every 0.1 mm. in the output gate 64, against the development of error pulses, in the usual way.

The output gate 65 monitors the contents of the pre-selection counter 61 which control the speed of the table 2 via the drive control 63 and traverse motor 6.

The invention is in no way limited to translatory motion as was the case in the example of application described above, but is also suitable for rotary movements, e.g. angular motion. It is restricted neither to decimal figures nor to the metric system. There is also no absolute necessity for only a single decade to be used for the scale to be scanned while illuminated.

We claim:

1. Digital control device for automatic positioning of a detecting means of a preselected number of positions, comprising a casing having a predetermined number of positions thereon, a carrier in which said detecting means is installed, said carrier in relation to said casing being displaced into a displacement with a positive sign and one with a negative sign, step by step, into said positions on said casing, a disc having steps on its circumference corresponding to the maximum number of said positions, an irreversible, stepping motor controlled by impulses fastened to said casing driving said disc and which in accordance with said steps executes the steps, whereby said carrier under pressure contacts one of said steps, storage means containing the preselected sign of the displacement direction and the preselection of said position, and which can emit the corresponding signals through the outputs, a step calculator which connects said storage means with said stepping motor and an independent impulse generator which feeds said stepping motor through said step calculator.

2. Digital control device, according to claim 1, wherein there are two leaf springs having one end stretched onto said casing and the other end onto said carrier forming a parallelogram, to produce said pressure.

3. Digital control device according to claim 1, wherein said step calculator comprises a first preselection counter, a second preselection counter, a gate circuit containing a first, second, third and fourth "AND" gate, a fifth "AND" gate with a "NOT" member and a first and second "OR" gate, on which said gate circuit of said impulse generator is connected over the inputs of said second and third "AND" gate, whereby the input of said first preselection counter is connected with the input to said first and second "AND" gate and the output of said 4th "AND" gate and the output of said first counter with the input of said fourth "AND" gate with said "NOT" member at the input of said fifth "AND" gate, whereas the input of said second preselection counter is connected with the output of said second gate and the output of second counter is connected with the input of said fifth gate, and the impulse generator on its part is in direct connection with the input of said third and fifth "AND" gate, and whereby in case of a preselected positive sign, the said signals extracted out of a first output from said storage means for said preselection of the storage position are transmitted into said first preselection counter, while said signal for said positive sign arrives from a second output to the input of said first "AND" gate, whereas in case of a perselected negative sign the corresponding said third output in said storage means is in contact with the inputs of said flip-flop, and said second and fifth "AND" gate, while the output of said flip-flop is in contact with a further input of said second preselection counter and transmits to said counter a maximum number of signals corresponding to a maximum number of said positions, and of this number the amount of signals corresponding to the preselected position are subtracted in said second preselection counter, furthermore there is a connection between said storage means and said input of said third "AND" gate where after the transmission of said signals from said storage and said flip-flop a signal is given for the start of a count-down process in both said preselection counters.

4. Digital control device according to claim 3 whereby said gate circuit after issuance of said starting signal over said third "AND" gate, said impulses at said impulse generator when transmitting said positive signs are fed to said first preselection counter for said count-down process, while in case of said negative sign said impulses are fed over the fifth "AND" gate and then over the second "OR" gate for said count-down process going to said second preselection counter.

5. Digital control device according to claim 4, whereby from the time of issuance of said starting signal to the end of said count-down process said impulses in case of said positive sign are lead over the input of said first "OR" gate to said stepping motor, and in case of said negative sign the impulses corresponding to the remaining content of said second preselection counter are fed over said first "OR" gate to said stepping motor.

6. Digital control device according to claim 5 wherein said maximum of preselectable positions are ten in number.

7. A device for the automatic displacement of a scale by a preselected decadal amount relative to a photoelectric scale-scanner, comprising a slider drive controlled by a signal proportional to the difference between the actual and nominal values, a sensor operated from at least the last decade of the nominal value, a stepped disc for operating said sensor, a stepping motor for driving said disc, a pulse computer feeding said motor with pulses and moving said sensor in the direciton of the enlarged projection of the scale divisions, said sensor being connected with said stepped disc via a contact and movable in the direction of the projected scale on a device consisting of two parallel flat springs.

8. A device as set forth in claim 7 wherein a pin makes contact with a stationary conductor at the moment when said contact passes from sector "9" to sector "0" on said stepped disc.

9. A device as set forth in claim 7 wherein said contact lies on said stepped disc by pre-tensioned springs.

References Cited

UNITED STATES PATENTS

| | | |
|---|---|---|
| 3,020,460 | 2/1962 | Morin et al. |
| 3,323,030 | 5/1967 | Inaba et al. |
| 3,370,289 | 2/1968 | Hedgcock et al. |
| 3,378,741 | 4/1968 | Sutton. |

ORIS L. RADER, Primary Examiner

THOMAS E. LYNCH, Assistant Examiner

U.S. Cl. X.R.

318—28, 162